March 10, 1970    R. A. MYERS ET AL    3,500,237
MODE COUPLING LASER APPARATUS
Filed Jan. 13, 1967
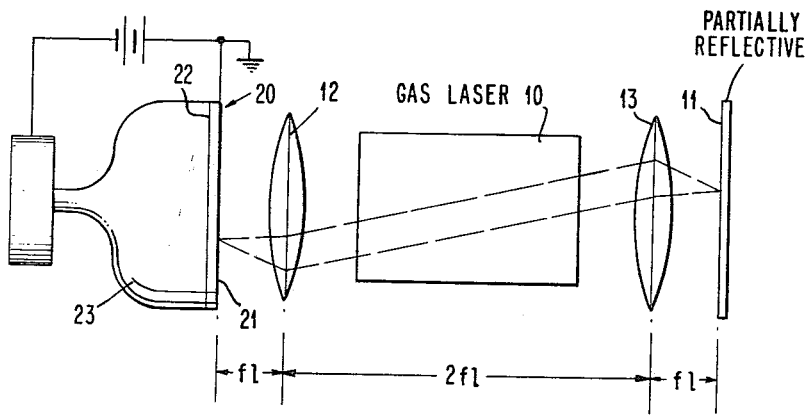
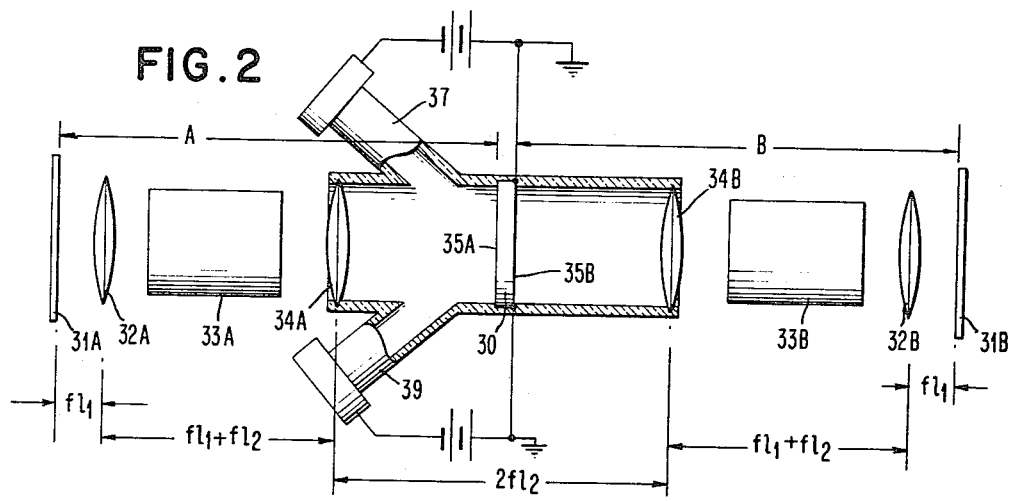
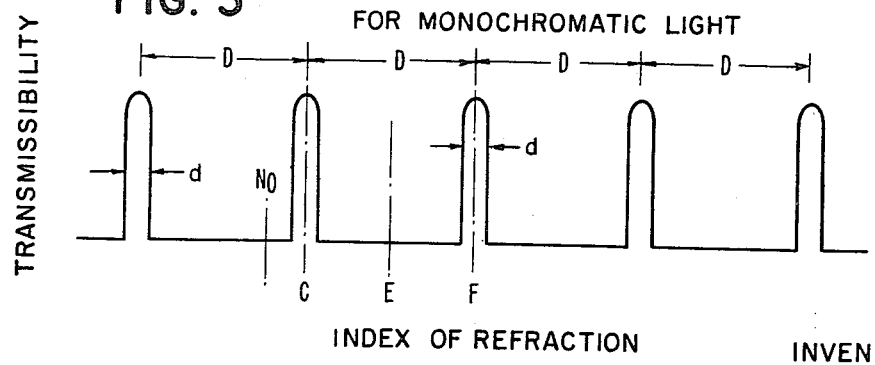
INVENTORS
ROBERT A. MYERS
HAROLD WIEDER
BY *Robert E. Sandt*
ATTORNEY

United States Patent Office 3,500,237
Patented Mar. 10, 1970

---

3,500,237
MODE COUPLING LASER APPARATUS
Robert A. Myers, New York, and Harold Wieder, Mahopac, N.Y., assignors to International Business Machines Corporation, Armonk, N.Y., a corporation of New York
Filed Jan. 13, 1967, Ser. No. 609,049
Int. Cl. G02f 1/28, 1/36; H01s 3/00
U.S. Cl. 331—94.5          4 Claims

ABSTRACT OF THE DISCLOSURE

Through localized control (by means of an electron beam) over the index of refraction of an electro-optic crystal, such as KDP, fabricated into an etalon, small volumes thereof may be selectively rendered transmissive or reflective. When the etalon forms an end mirror of an angularly degenerate flat-field laser cavity the cavity gain necessary to support stimulated emission may be angularly oriented along any one of many possible axes so as to produce a flying spot generator. By interposing the etalon, which is itself a resonant cavity, between two laser cavities, for which the reflecting surfaces of the etalon act as end mirrors, the two cavities may be selectively mode coupled.

BACKGROUND OF THE INVENTION

Prior to the instant invention it has been known to selectively spoil the Q of an angularly degenerate laser cavity to establish a preferred axis of oscillation in which the Q is a maximum. This has been achieved through exploiting the various magneto-optical and electro-optical properties of crystals, which either provided a controllable optical path length or altered the polarization to selectively spoil the cavity gain to establish a preferred axis of stimulated emission. Exemplary of these devices is that disclosed and claimed in the application of Robert V. Pole and Robert A. Myers, Ser. No. 412,814, filed Nov. 20, 1964 in which an electron beam locally changes the index of refraction of a KDP crystal within a resonating cavity to provide selective phase retardation to quench the stimulated emission along all axes except the selected one.

An example of a scanning laser in which selective control over the bi-refringence of a crystal is disclosed and claimed in the application of Robert V. Pole, Ser. No. 332,617, filed Dec. 23, 1963, and assigned to the assignee of the instant application.

SUMMARY OF THE INVENTION

The present invention employs an electro-optical crystal disposed between two highly reflective but partially transparent surfaces as the end mirror of a flat-field angularly degenerate laser cavity and a positionable electric field generator to selectively alter the index of refraction of the crystal in small volumes thereof to render the end mirror selectivity reflective in small areas thereof to induce stimulated emission along a path determined by the selected spatial orientation of the reflecting area.

The invention further contemplates the exploitation of the selective spatial control over the transmissibility and reflectivity of a resonant cavity filter to selectively couple two laser cavities to oscillate in a common mode.

In accordance with the foregoing summary of the invention it is an object of this invention to employ a resonant cavity filter as the end mirror of a degenerate resonant laser cavity and to selectively control the transmissibility and reflectivity of small areas of the filter to establish a preferred axis of oscillation within the laser cavity so as to control the direction of emission of the laser beam.

A further object of the invention is to employ the resonant cavity filter as a coupling element between two laser cavities to cause the two cavities to lase as one in anyone of a plurality of selectable modes of oscillation.

Yet another, and more specific, object of the invention is to employ an electro-optic crystal as the medium separating the reflecting surfaces in a resonant cavity filter disposed as one of the end mirrors of a flat-field angularly degenerate laser cavity and to control the index of refraction of selected small volumes of the crystal to cause the filter to become selectively reflecting to establish preferred axes of stimulated emission within the cavity.

The foregoing and other objects, features and advantages of the invention will be apparent from the following more particular description of preferred embodiments of the invention, as illustrated in the accompanying drawings.

In the drawings:

FIG. 1 is a schematic representation of a scanning laser cavity.

FIG. 2 is a schematic representation of an apparatus for selectively coupling two laser cavities.

FIG. 3 is a plot of the transmission characteristics of an etalon for a single wavelength of light.

DESCRIPTION OF THE PREFERRED EMBODIMENTS

The principle of the invention is most simply illustrated by reference to the embodiment of FIG. 1, the explanation of which will serve as an introduction to that for the embodiment of FIG. 2. The first embodiment functions to control the direction of emission of a laser beam and, within limits, the intensity thereof. This flying spot generator for ease of reference is called a "scanlaser," in that it controls the direction of emission by selectively altering the gain or Q of an angularly degenerate laser cavity to establish a preferred axis of oscillation while "spoiling," or detuning, the unwanted axes. Specifically in FIG. 1 the laser cavity is bounded by the reflecting surfaces 11 and 21 between which are disposed the active lasing element 10 and the lenses 12 and 13 to form an angularly degenerate flat-field cavity. The lasing element 10 is preferably a high gain gas laser with a small length to diameter ratio and Brewster angle end plates. A hollow cathode mercury gas laser having an emission of 6150 A. is typical, although other lasers, including solid lasers may be employed. The lenses 12 and 13 and the total geometry of the cavity are so chosen and arranged that the surfaces 11 and 21 are optically conjugate surfaces separated by an optical path length resonant to the wavelength of the characteristic emission of the lasing element 10. Since each point on one of the reflecting surfaces is an object for a corresponding image point on the other mirror, the cavity is angularly degenerate, that is, each of the angularly oriented possible modes of oscillation is equally susceptible to sustained oscillation.

By selectively controlling the location of incremental reflecting areas of the surface 21, all oscillation modes other than the selected one are "spoiled." Expressed in another manner the maximum gain, or Q, of the cavity is confined to a path between two small conjugate areas on the two reflecting surfaces. In physical analogy it is as if a tiny mirror were moved about in the plane of the surface 21. Lasing action occurs only between this mirror and a corresponding area on the surface 11, which, being partially reflecting, permits the laser beam to exit from the cavity on an axis determined by the spatial location of the tiny mirror.

To control the position of the analogous "tiny mirror" the reflecting surface 21 is formed upon the front surface of a specially fabricated Fabry-Perot etalon 20. In the classic configuration of this device, as described by Born and Wolf at pages 328 and 346 of Principles of Optics, Pergamon Press 1959, two partially transparent films of high reflectivity are disposed to enclose a plane parallel plate of air or dielectric material to form a cavity resonant to the desired wavelength(s) of the light to be passed by the device, which acts as a filter. By altering the spacing of the surfaces, or by altering the index of refraction of the material between the reflecting surfaces the filter may be adjusted to pass light of the desired wavelength, while reflecting light having wavelengths to which the cavity is non-resonant. In the instant use of the etalon 20 the reflectivity or transmissibility of the etalon is locally controllable in small areas. To achieve this etalon 20 is fabricated from an electro-optical material such as potassium dihydrogen phosphate ($KH_2PO_4$), commonly referred to as KDP. This material is cut so that the electrically induced optical axes are in the plane of the coating (a "Z-cut" crystal). The highly reflecting and partially transparent coatings 21 and 22 are deposited on the plane parallel faces of the KDP crystal, with the coating 21 a continuous conductor connected to ground, and the coating 22 a continuous dielectric reflector. The etalon, thus formed, is in effect a continuous array of tiny etalons each individually controllable to be transmissive or highly reflective.

To provide the requisite control over the tiny incremental volumes of the etalon 20 and thus the reflectivity of the corresponding terminal areas thereof, the etalon 20 is formed as the face of a cathode ray tube 23, with the dielectric face 22 of the etalon facing the electron gun of the CRT. A deposit of charge from the electron gun onto the dielectric face provides a local electric field at a desired point on the etalon, which in turn, provides a locally enhanced or spoiled Q of the resonator for as long a period as it takes for the charge to leak through to the conductive side of the etalon.

The etalon 20, by critical fabrication, or by adjustment, is, in the absence of an electron beam in tube 23, normally transparent to the wavelength of the characteristic emission of the lasing element 10. Adjustment of the initial operating conditions is achieved by controlling the operating temperature, by application of an initial mechanical stress, or by application of an initial electrical bias. Of these, the control of the operating temperature is preferred. With the surface 21 transparent to the wavelength of the characteristic emission of the lasing element 10, there is in effect no end mirror on the left of the cavity. Therefore there can be no amplification and no lasing action. When, however, the electron beam is directed to any position on the dielectric mirror, the field created by the charge through the incremental volume of the KDP crystal selected by the beam changes the index of refraction of that volume to a condition of non-resonance to the laser wavelength. The area of the surface 21 opposite this tiny "plug" of KDP thus becomes highly reflective, and lasing action between that area and a corresponding area on surface 11 is initiated. The lasing beam, therefore, exits through the mirror along an axis selected by the positioning of the electron beam in the cathode ray tube.

As an extrapolation of a flying spot scanner, it is possible by exploiting the decay time necessary for the charge induced by the electron beam to dissipate to create a complete display by employing a raster scan and modulating the beam intensity at a sufficiently rapid repetition rate to replace the charge before it dissipates. Thus, it is possible to create a plurality of reflecting areas simultaneously which will support a plurality of oscillation modes.

A further utilization of the spot controlled etalon is shown in the second embodiment in FIG. 2. In this application two flat-field laser cavities are mode-coupled by means of the variable etalon to lase as one. As in FIG. 1 the etalon 30 is rendered selectively transparent or reflective through the control of a cathode ray tube electron beam. Normally the etalon 30 is highly reflective so that each separate laser cavity A and B is capable of supporting independent lasing action. Normally, however, only one of the cavities will be lasing, while the lasing element of the second cavity will be operated just below the threshold necessary to sustain the lasing action. When the electron beam opens a "hole" in the etalon window 30, the two cavities will be coupled to induce the formerly inactive cavity to lase in synchronism with the first cavity in accordance with the selected mode.

The arrangement in FIG. 2 that permits the foregoing function includes two identical cavities A and B separated by an etalon window 30. Since both cavities are identical, corresponding elements thereof bear the same reference numbers with different appended letters. Thus, cavity A includes the mirror 31A, lens 32A, active lasing medium 33A, lens 34A, and reflective surface 35A (on etalon 30). As in the FIG. 1 embodiment the reflective surfaces are optically conjugate and tuned to support the lasing action at the characteristic wavelength of the emission of the active lasing element 33A (or 33B), preferably a gas laser.

The etalon 30 is normally highly reflective in the absence of the electron beam, or, expressed in another manner, the etalon cavity is non-resonant to emission wavelength. In the presence of an electron beam the "hole" produced in the etalon becomes a resonant cavity to the emission wavelength, so that a joined cavity consisting of three resonant cavities (cavity $A$+etalon+cavity $B$) is formed to provide the coupling.

If it is assumed by way of example that the lasing element 33A is operating above threshold and etalon 30 inactive (highly reflective), then laser action will occur within the cavity A in all of the angularly degenerate modes. The lasing medium 33B is operated just below threshold and no lasing action occurs in cavity B. If the electron beam impinges on the etalon 30 to cause it to become a resonant cavity in a small incremental volume thereof, then the "hole" thus opened will permit the oscillation mode at that location to escape into cavity B, where it will excite the lasing medium 33B to stimulated emission and both elements will combine to lase in the selected mode. The non-selected modes in cavity A will continue to lase. The selected mode will operate between the reflective surfaces 31A and 31B through the "hole" in the etalon 30. Since the geometry of cavities A and B are both resonant to the emission wavelength and the "hole" is resonant, the sum of the optical paths through the various media is also resonant. Mirror 31A or 31B (preferably 31B) may be made semi-transmissive to permit the selected mode emission to exit from the cavity.

Because both surfaces of the etalon 30 serve as end mirrors of a laser cavity the electron gun structure of FIG. 1 must be modified to remove the gun from the optical path. This is achieved in FIG. 2 by employing a skewed gun structure 37 in combination with the dielectric reflective surface 35A, and the grounded conducting reflector 35B. A second skewed gun 39 provides a second addressing means to permit the performance of logic. The cathode ray tube envelope is formed to include the lenses 34A and 34B as well as the etalon 30. This permits the electron beam to impinge directly on the dielectric reflecting surface 35A. The two gun arrangement provides for alternative control or additive control.

Before examining the logic possibilities of the embodiment of FIG. 2 it is well to digress and examine in greater detail the properties of KDP and the derivative properties of the etalon. In FIG. 3 there is shown a diagram of the transmission characteristics of an etalon as a function of the index of refraction of the medium separating the reflecting plates for a single wavelength monochromatic light. Examination reveals that there is a periodic recurrence of maximum transmissibility at differences D in the indices of refraction. The spread $d$ of the index of refraction at which transmission occurs represents the device sensitivity. The difference D represents a change in the optical path of one-half the optical wavelength. The ratio of $D/d$ may range from 10 to 50. In operation, an initial index, such as $N_0$, may be selected wherein the etalon is non-transmissive (highly reflective), and by application of a control potential a variation of as little as one-tenth or one-fiftieth of the optical wavelength will render the etalon transmissive. In KDP this can be achieved with one kilovolt or less, the change in the index of refraction being expressed by the formula:

$$N = N_0 \pm N_0^3 rE/2$$

where $r$ is the electro-optic constant of the material and $E$ is the applied field. The laser is aligned so that its polarization is substantially along an induced optical axis of the KDP crystal. Since the material does not have an inversion center, the index of refraction can be either increased or decreased by changing the sign of the field. Within limits, therefore, the index of refraction can be changed through several successive transmission peaks by the application of controlled magnitudes of charge from one or both of the electron guns, and by exploiting the charge decay delay. If by application of a previous charge the two cavities are mode coupled to be operating at point C in FIG. 3, then before the charge decays a second charge is added, the index of refraction can be changed to point E. Thus if point C represents a binary "1" a change in the index of refraction of $D/2$ results in a binary "0." If another change of $D/2$ is effected then a binary "1" (point F) is again achieved. This serial operation with one gun can be achieved by operating the electron beam in a raster scan mode and gating the beam on and off at the appropriate times during the scan to activate the desired modes in the mosaic. The same charge addition can be achieved in parallel through use of the two or more guns.

While an electron beam has been shown as the means for producing localized fields in the KDP crystal it is equally possible to apply these fields by direct electrical connection. In such instance the coatings 22 (FIG. 1) and 35A (FIG. 2) would be formed as a mosaic of tiny dots of electrically conductive and reflective material (silver, for example) with individual wired connections thereto. By switching potential to any dot the requisite electrical field to ground will produce the change in the index of refraction in the "plug" of KDP crystal aligned therewith.

It will readily be appreciated from the foregoing brief explanation of the significance of FIG. 3 that by suitable combinations of field strengths, either serially or in parallel, the coupling of the various modes between the two cavities may operate in response to various combinations of binary conditions precedent to manifest the various logical functions. These all arise because of the periodic nature of the transmission characteristics of the etalon as a function of the changes in the index of refraction, which in turn is a function of the applied field. When the two cavities are mode coupled, the "hole" in the etalon is also resonant. Therefore, the coupled oscillation mode is stable.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for selectively coupling two lasers, comprising:

(a) a first active lasing medium operative to produce stimulated emission of a given wavelength when operated in a cavity resonant to that wavelength;

(b) a first angularly degenerate laser cavity including first and second optically conjugate reflecting surfaces enclosing said first active lasing medium for producing stimulated emission between said first and second reflecting surfaces in a plurality of angularly oriented oscillation modes of said given wavelength;

(c) a second active lasing medium for producing stimulated emission of said given wavelength when operated in a cavity resonant to that wavelength, the said second medium, operating below the threshold necessary to support such emission;

(d) a second angularly degenerate laser cavity coaxially disposed with respect to said first cavity and including third and fourth optically conjugate reflecting surfaces enclosing said second active lasing medium and normally inoperative to produce stimulated emission;

(e) means integral with said second and said third surfaces for selectively rendering aligned areas thereof transparent to light of said given wavelength, whereby the emission from said first cavity will pass to the second cavity through the selected transparent areas of the two reflecting surfaces to produce a combined stimulated emission in the two cavities between said first and said fourth reflecting surfaces.

2. The apparatus of claim 1 wherein the means integral with said second and third reflecting surfaces comprises a resonant cavity interference type filter the coatings of which provide the said second and third reflecting surfaces.

3. The apparatus of claim 2 wherein the said resonant cavity interference type filter comprises an electro-optic crystal whose index of refraction changes in response to an applied electric field upon which are deposited highly reflective but partially transparent coatings, and the means for selectively rendering the coatings and the filter transparent comprise means for applying a variable electrical field to the crystal to vary the index of refraction thereof to render the filter resonant and transmissive to the emission of said given wavelength.

4. The apparatus of claim 3 wherein the first one of said coatings is fabricated of a reflective dielectric material and the second one of said coatings is fabricated of a reflective electrical conducting material and the means for applying a variable electrical field comprises an electron gun operable to selectively apply electrical charges to discrete areas of said first coating to produce the electrical field in the crystal.

References Cited

UNITED STATES PATENTS

| | | | |
|---|---|---|---|
| 3,292,103 | 12/1966 | Soules et al. | 331—94.5 |
| 3,339,151 | 8/1957 | Smith | 331—94.5 |
| 3,395,960 | 8/1968 | Chang et al. | 350—150 |
| 3,396,305 | 8/1968 | Buddecke et al. | 350—150 X |

OTHER REFERENCES

Conjugate-Concentric Laser Resonator by R. V. Pole, J.O.S.A., vol. 55, No. 3, March 1965.

RONALD L. WIBERT, Primary Examiner

P. K. GODWIN, JR., Assistant Examiner

U.S. Cl. X.R.

315—13; 350—150, 160; 356—112